United States Patent [19]

Hallenbeck

[11] 4,415,114

[45] Nov. 15, 1983

[54] PURGE GAS UNIT WITH CONES

[76] Inventor: Emerson J. Hallenbeck, 2934 Shoreland Ave., Toledo, Ohio 43611

[21] Appl. No.: 261,577

[22] Filed: May 7, 1981

[51] Int. Cl.$^3$ ............................................ B23K 37/00
[52] U.S. Cl. ...................................... 228/57; 228/219
[58] Field of Search .................. 228/219, 42, 56.5, 50, 228/57; 219/72, 60 A, 60 R; 138/89, 90, 91

[56] References Cited

U.S. PATENT DOCUMENTS 1,647,223  11/1927  Hart ...................................... 138/91
2,654,014  9/1953  Schaefer ......................... 219/260 R

OTHER PUBLICATIONS

Raymond A. Mueller, *Welding Apparatus*, Jun. 30, 1953.

*Primary Examiner*—Nicholas P. Godici
*Assistant Examiner*—M. Jordan
*Attorney, Agent, or Firm*—Allen D. Gutchess, Jr.

[57] ABSTRACT

A purge gas unit is provided for establishing an enclosed zone for purge gas within a tube or pipe having portions which are to be joined by welding at a predetermined location relative to the length of the tube or pipe. The purge unit includes at least one cone to be positioned on one side of the location where the welding is performed and a second cone positioned on the other side of the location. A purge gas supply tube is connected between the cones and has at least one opening therebetween through which purge gas is supplied to the weld zone in the pipe or tube between the cones. The gas supply tube extends through one of the cones beyond the weld zone defined between them and is connected to gas supply means. The gas supply tube also aids in withdrawing the cones from the pipe or tube after the weld is completed or, with tubing which is moved continuously and butt-welded along a longitudinal seam, the gas supply tube can be used to hold the cones in a stationary position as the tubing is moved longitudinally during the forming and welding operations. In a preferred form, the cones face in a common direction. Also, the gas supply tube between the cones can be flexible to enable the cones to be withdrawn through a curved portion of the pipe or tube after the welding operation when the pipe or tube is stationary.

10 Claims, 7 Drawing Figures

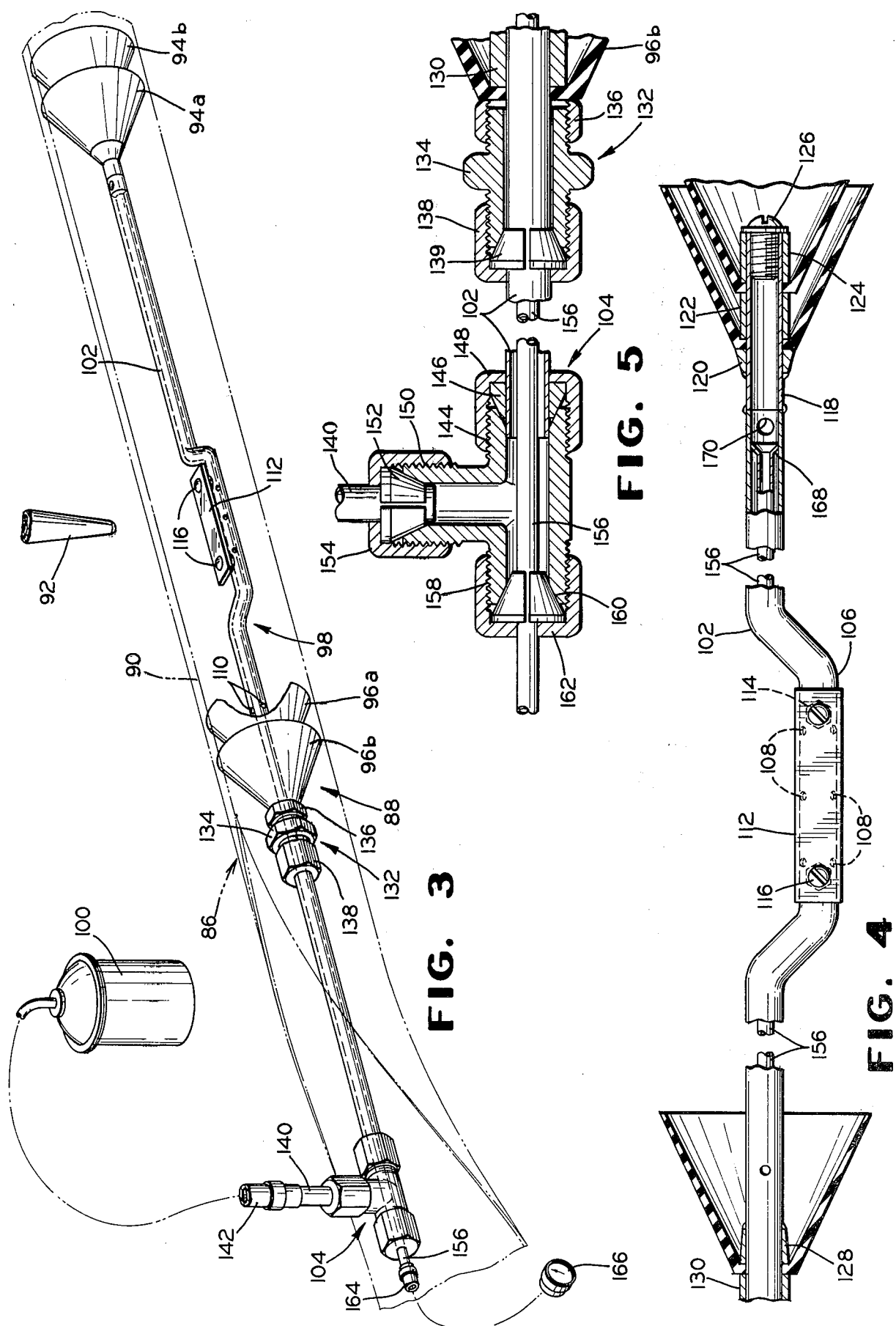

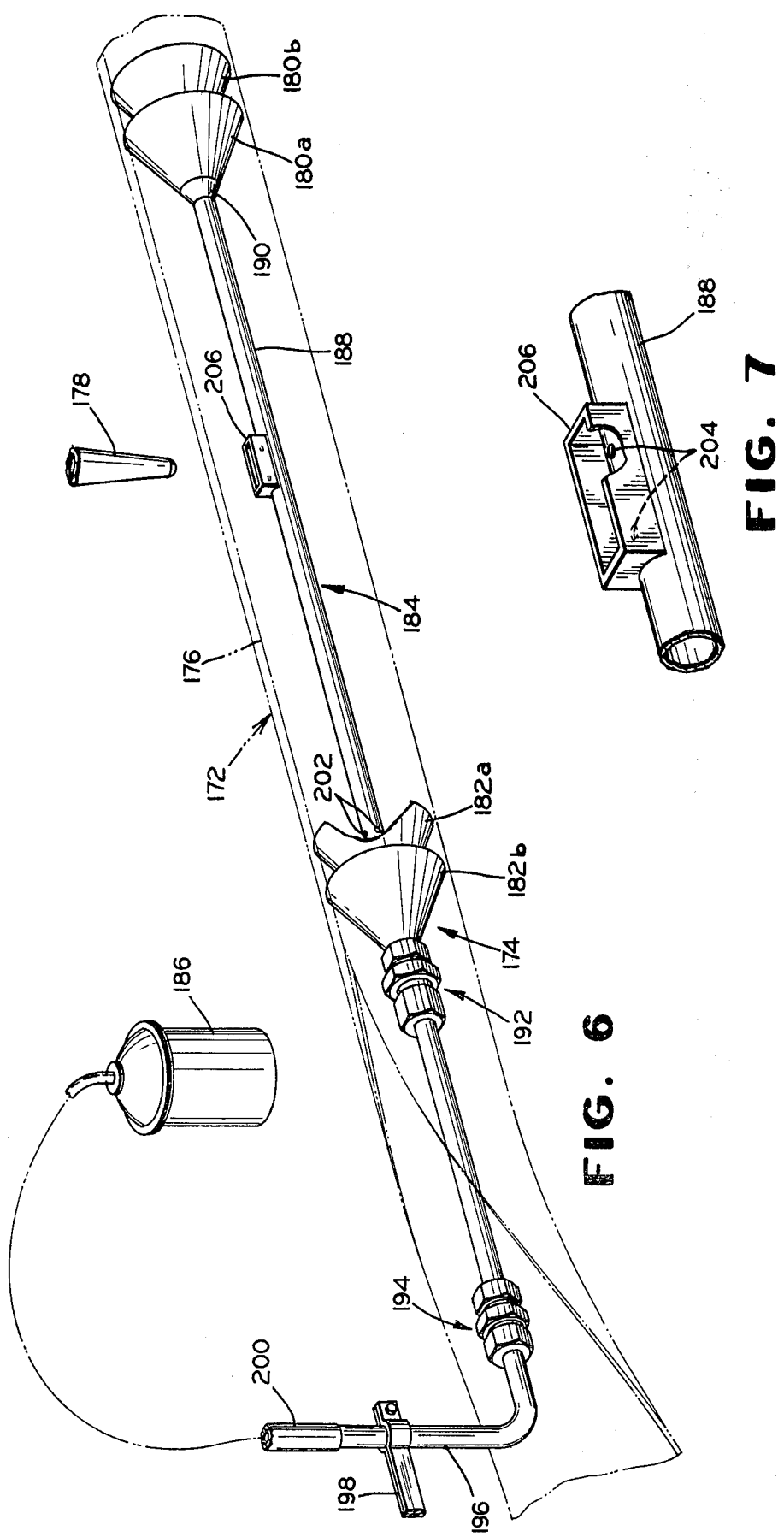

PURGE GAS UNIT WITH CONES

This invention relates to a gas purge unit for establishing an enclosed zone at a weld area to receive and contain a purge gas during welding.

When welding many alloy metals, it is essential that the weld area be out of contact with air or any other form of oxygen during the welding operation. Otherwise, the metal in the weld area oxidizes and produces micro-cracks. When welding pipes or tubes, it has been necessary to purge the entire pipe or tube, or substantial lengths thereof, to maintain the weld area within the pipe or tube free of oxygen during the welding operation. This has required a considerable amount of time in order to supply the purge gas for a sufficient period or purge impurities from the pipe or tube and it has also required a considerable volume of the purge gas, which can be very expensive.

The present invention provides a purge unit for use in welding pipes or tubes, hereinafter called tubular members. The purge unit is employed when welding apparatus is used to perform a welding operation at a predetermined location of the tubular members relative to the length thereof. The purge unit includes at least one first cone to be positioned on one side of the location of the welding apparatus and at least one second cone to be positioned on the other side of the welding apparatus location, with both cones being within the tubular members. A gas supply tube is connected to the apex of the first cone and extends through the apex of the second cone and beyond the space between the cones into which purge gas is supplied through at least one opening in the gas supply tube between the cones. A monitoring tube can also be used within the gas supply tube and communicates with the space between the cones to measure the pressure of the purge gas therein by an external instrument connected to the monitoring tube.

In most instances, there is relative movement established between the tubular members and the purge unit. Where two tubular sections are to be butt-welded along a circumferential joint, the cones are positioned on each side of the joint with the gas supply tube extended through an open end of one of the tubes, which may be some distance away. After the gas is supplied through the gas supply tube and the space between the tones is purged, the welding is then initiated with the purge gas continuing to be supplied until the weld is completed. The supply tube and cones are then drawn out through the open end of one of the tubular sections so that the relative movement in this instance results from movement of the cones relative to the stationary tubular sections. In such an instance, the cones preferably face in a common direction toward the open end of the tube section through which they are to be drawn.

In another application of the purge unit according to the invention, tubular members with seams are formed from flat stock which is bent into a circular shape as it is moved along a predetermined path with longitudinal abutting edges then welded. The cones again are located in the tubular member on each side of the weld location where the longitudinal edges are welded. In this instance, the cones are held stationary while the tubular members move continuously during the forming and welding operation tions. Again, the cones preferably face in a common direction, toward the open end where the tubular member is being formed.

It is, therefore, a principal object of the invention to provide a purge unit for supplying and maintaining purge gas within tubular members which are to be welded at a predetermined location relative to the length of the tubular members.

Another object of the invention is to provide a purge unit for use in tubular members to be welded, which unit includes a first cone on one side of the weld location, a second cone on the other side of the weld location, and a gas supply tube connected between the cones and extending beyond the space between them for supplying purge gas to the space.

Yet another object of the invention is to provide a purge unit for tubular members to be welded, which unit has two connected cones on opposite sides of the weld location and facing in a common direction for relative movement between the cones and the tubular members during or after the welding operation.

Still another object of the invention is to provide a purge unit for tubular members which includes at least two spaced cones located within the members and connected by a gas supply tube and further includes a monitoring tube within the gas supply tube for monitoring the pressure of purge gas in the space between the cones.

Other objects and advantages of the invention will be apparent from the following detailed description of preferred embodiments of the invention, reference being made to the accompanying drawings, in which:

FIG. 3 is a view in perspective of a purge unit and a tubular member shown in dotted lines being formed and butt-welded at a predetermined location longitudinally of the tubular member;

FIG. 4 is a plan view of a portion of the purge unit of FIG. 3;

FIG. 5 is a fragmentary, enlarged view in longitudinal section of fittings employed with the purge unit of FIGS. 3 and 4;

FIG. 6 is a view in perspective similar to FIG. 3 of the tubular member and a modified purge unit; and FIG. 7 is a fragmentary, enlarged view in perspective of a portion of the purge unit of FIG. 6.

Figure 1:
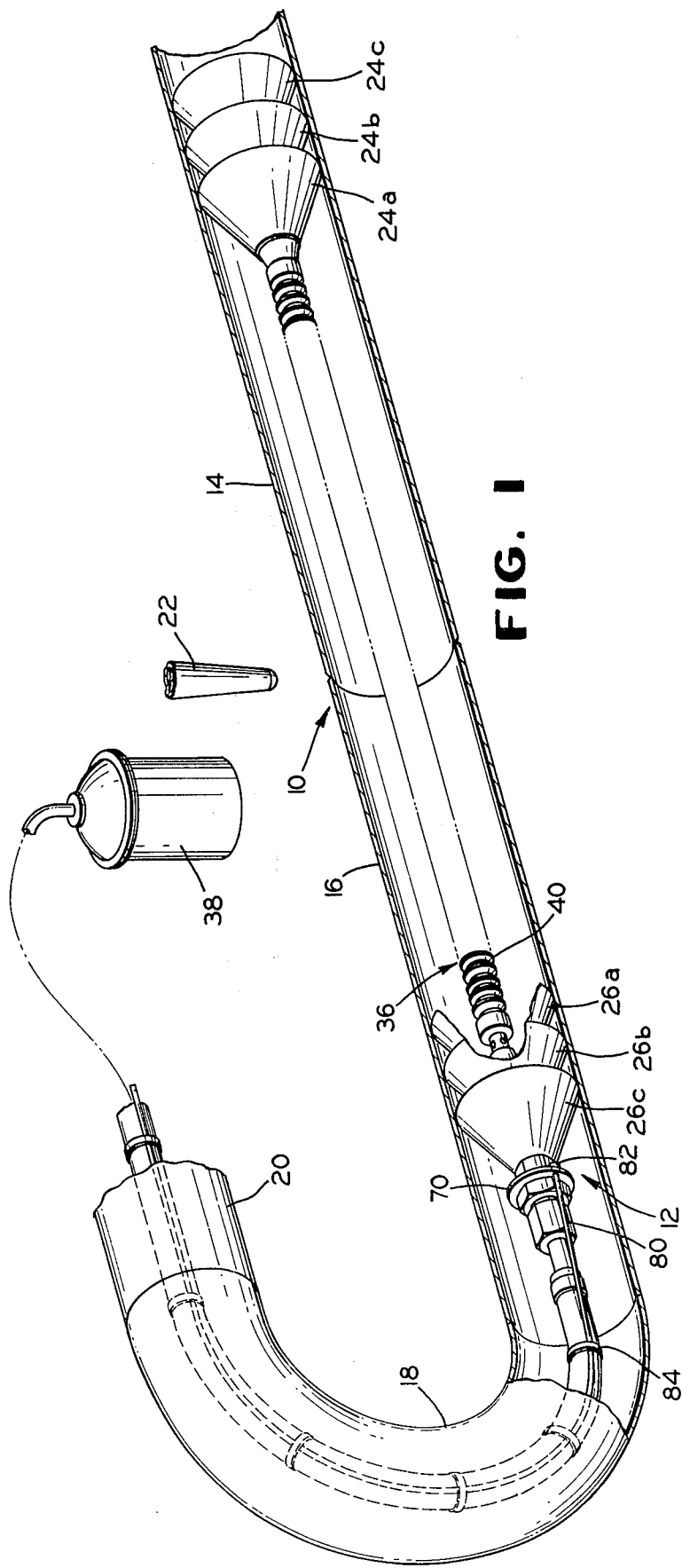
FIG. 1 is a view in perspective, with parts broken away, of a tubular member in the form of two separate tubular sections to be butt-welded at a circumferential location, and a purge unit embodying the invention located therein.
Figure 2:
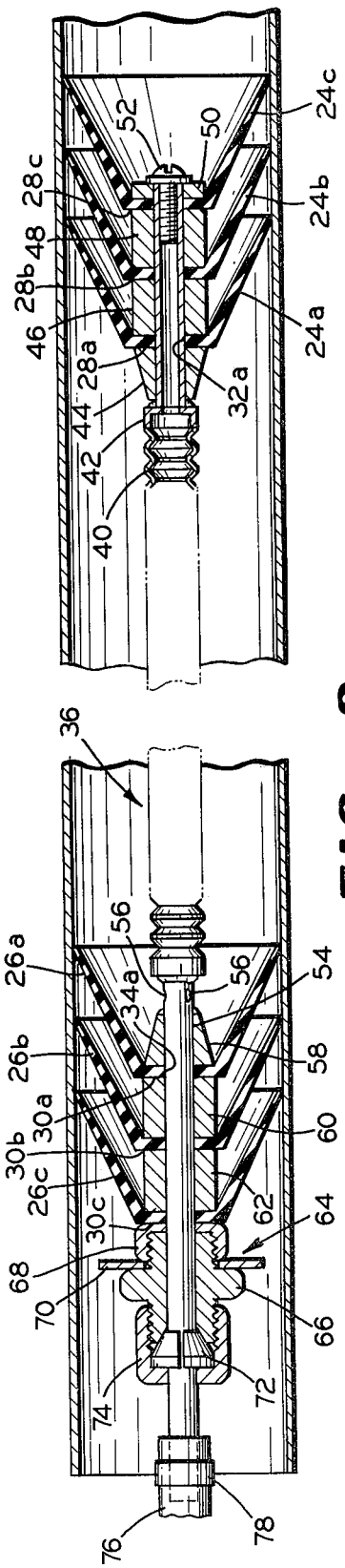
FIG. 2 is a fragmentary, enlarged view in longitudinal section of the tubular sections and the purge unit of FIG. 1.

Referring to the drawings, and particularly to FIGS. 1 and 2, a tubular member indicated at 10 is to be welded with the aid of a purge unit indicated at 12. The tubular member 10, in this instance, actually consists of two separate tubular sections 14 and 16 which are to be butt-welded at their ends at a predetermined location with the weld extending circumferentially of the tubular member 10. The tubular section 16, as shown, is joined to a curved tubular section 18 and another tubular section 20 by previous welding operations, with the tubular section 20 having an open end. The butt-weld at the ends of the sections 14 and 16 is accomplished by welding apparatus indicated at 22. This can be conventional gas welding apparatus or other types of welding, including use of a plasma arc torch or a T.I.G. process, can be employed. In any case, when welding many alloys, such as high nickle steel and stainless steel, it is essential that the weld be accomplished in an inert atmosphere, including inside the tubular member. If the metal comes in contact with oxygen during the welding operation, oxidation and micro-cracks result in the weld area. Heretofore, it has been the practice to purge the entire tubular member being welded with purge gas prior to welding and then to maintain purge gas in the tubular member under pressure during the welding operation. This was time consuming, particularly to purge the entire tubular member of oxygen, and required substantial quantities of the purge gas.

The purge unit 12 includes first cones 24 on one side of the weld zone or location, there being three of the first cones 24, in this instance, being designated 24a, 24b and 24c. The purge unit 12 also includes second cones 26 on the other side of the weld zone or location, there being three of the second cones 26, in this instance, being designated 26a, 26b and 26c. The cones 24 and 26 are made of flexible material, preferably silicone rubber. The diameter of the edges of the cones at the bases thereof preferably slightly exceeds the inner diameter of the tubular member 10 so as to assure good contact with the inside of the tube when in welding position. Purge gas leaking past the edge of the first cone 24a adjacent the weld zone tends to urge the first cone against the inside of the tubular member 10 more tightly, as is similarly true of purge gas leaking between the second and third cones 24b and 24c, causing the second cone 24b to be urged against the inside of the tubular member more tightly. The pressure of the purge gas also acts directly on the inside of the cone 26a, urging its base edge more tightly against the inside diameter of the tubular member.

As shown particularly in FIG. 2, the cones are thicker at their apex portions than at their base portions to provide proper resiliency. The apexes of the cones are not pointed but, rather terminate in circular portions designated 28 for the cones 24, and 30 for the cones 26. The circular portions 28 and 30 have central openings 32 and 34 of equal diameter for receiving portions of a gas supply tube 36. If desired, circular discs having diameters slightly smaller than the inside diameter of the tubular member 10 can be employed with the cones 24 and 26 to aid in centering the cones in the tubular member. This is particularly true when only one cone or two cones are employed on each side of the weld location.

The gas supply tube 36 connects the apexes of the cones 24 and the cones 26, extending through the cones 26 where it communicates with a source 38 of purge or inert gas located outside the open ended tube section 20. The gas supply tube 36 includes a flexible connecting tube 40 between the first and the second zones 24 and 26. The flexible tube 40 is of a bellows shape, having an undulating configuration in longitudinal cross section, as shown in FIG. 2. The flexibility of the connecting tube 40 enables the gas supply tube 36 to bend around the curved tubular section 18 when the purge unit 12 is removed from the tubular member 10 after welding.

The downstream end of the connecting tube 40 is affixed, as by welding, to a rigid end tube 42 which extends through the circular portions 28 of the cones 24. A conical stop 44 is affixed to the end tube 42 near the downstream end of the flexible tube 40 and abuts the upstream face of the circular portion 28a of the cone 24a. A spacing sleeve 46 is located between the circular portions 28a and 28b while a similar spacing tube 48 is located between the circular portions 28b and 28c. A washer 50 is located adjacent the downstream surface of the circular portion 28c and a threaded fastener 52 is threaded into the downstream end of the end tube 42 and holds the three cones 24a, 24b and 24c in place with the aid of the conical stop 44, the spacing sleeves 46 and 48, and the washer 50. This mounting arrangement enables the cones 24 to be quickly replaced, when needed.

A rigid end supply tube 54 is affixed to the upstream end of the connecting tube 40 adjacent the cones 26. The tube 54 has the same diameter as the tube 42 so that the openings 34 in the cones 26 can be the same size as the openings 32 in the cones 24 and so that identical cones can be used for all six. The end supply tube 54 also has openings 56 in the downstream end adjacent the connecting tube 40 to supply the purge or inert gas to the space between the first and second cones 24 and 26 and to the weld location or zone therebetween. A conical stop 58 is affixed to the end tube 54 and spacing sleeves 60 and 62 are also located on the end tube 54 to position and hold the cones 26 in place on the tube 54. However, in place of the washer 50 and the fastener 52, a coupling fitting 64 is located adjacent the circular portion 30c of the cone 26c. The fitting 64 includes a union 66 having threaded ends with a nut 68 threaded on the downstream end of the union 66 and clamping an anchor ring 70 therebetween. The union 66 and the nut 68 are pushed up against the circular portion 30c of the cone 26c and the fitting 64 is then held in place to hold the three cones in place with the aid of the cone stop 58 and the spacing sleeve 60 and 62. This is accomplished through a split ferrule 72 held on the tube 54 by an upstream nut 74 of the fitting 64. The nut 74 can be unscrewed and the fitting 64 can be slipped off the upstream end of the end tube 54 to enable the cones 26 to be readily replaced.

A supply hose 76 which forms part of the gas supply tube is affixed to the upstream end of the end tube 54 by a suitable collar 78. The flexible hose 76 extends through the tubular sections 18 and 20 and can be suitably connected to the source 38 of inert gas outside the tube section 20. A removal cable 80 has an enlarged end 82 anchored in the anchor ring 70. The cable 80 extends along the supply hose 76, being held by suitable bands 84 with the cable also extending beyond the open end of the tube section 20. When the weld is completed at the welding location or zone, the purge unit 12 can then be removed from the tubular member 10 by means of the cable 80 which is pulled outwardly through the section 20 to remove the entire purge unit 12 from the tubular member.

The purge unit is placed in the tubular member 10 by inserting the cones 24 into the section 14 and by inserting the cones 26 in the tube section 16 prior to placing the sections in abutting relationship. If the tube section 14 is not excessively long, the entire purge unit can be pulled through the open end of the tube section 14 with the aid of the cable 80 until the cones 24 are in position on the downstream side of the weld location or zone.

Referring to the embodiment of FIGS. 3–5, a tubular member 86 indicated in dotted lines is employed with a modified purge unit 88. The basic difference between the embodiment of FIGS. 1 and 2 and the embodiment of FIGS. 3–5 is that in the first embodiment, the purge unit is moved relative to the tubular member and in the second embodiment, the tubular member is moved relative to the purge unit. Also, in the embodiment of FIGS. 1 and 2, while the weld is at a predetermined location relative to the longitudinal extent of the tubular member, the weld is formed circumferentially around the tubular member. In the embodiment of FIGS. 3-5, the weld is also at a predetermined location but is performed longitudinally of the tubular member.

The tubular member 86 in FIG. 3 is a tube having a longitudinal seam which is formed from a flat ribbon of metal. As the ribbon is moved longitudinally, it is formed into a circular configuration having a longitudinally-abutting seam indicated at 90. The edges of the seam are then welded together by suitable welding apparatus 92 which again can be conventional gas welding apparatus, plasma arc welding apparatus, or apparatus using the T.I.G. process.

The purge apparatus 88 includes first cones 94, there being two cones, in this instance, designated 94a and 94b located on one side of the welding location or zone. The apparatus also includes second cones 96, there being two of the second cones designated 96a and 96b, in this instance, located on the other side of the weld location or zone. These cones can be the same as those of the purge unit 12.

A gas supply tube 98 supplies inert or purge gas to the space between the first and second cones 94 and 96 to keep oxygen from the weld location during a welding operation. The gas supply tube 98 connects the apexes of the cones 94 and 96, extending through the cones 96 and communicating with a source 100 of purge or inert gas located outside the tubular member 86. The gas supply tube 98 includes a rigid supply section 102 connected between the cones 94 and 96 and extending beyond the cones 96 to a T-shaped fitting 104. The fitting 104 can be suitably supported and rigidly held so as to maintain the overall purge unit 88 in place as the tubular member 86 is being longitudinally moved to be formed and welded. The rigid supply tube 102 has a horizontal offset 106 therein at the weld location in which are gas emitting openings or orifices 108 on the sides thereof. Additional openings or orifices 110 are also located in the tube 102 near the upstream end thereof, in this instance. Particularly when plasma arc welding is employed, a copper shielding plate 112 is affixed on the upper side of the offset 106 of the gas supply tube 102 to protect the tube at the welding location. As shown, nuts 114 are tack-welded to the top of the offset 106 and the shield 112 is affixed to the nuts by screws 116.

The downstream end of the connecting tube is affixed, as by welding, to a rigid end tube 118 which extends through circular portions of the cones 94, with the cones being held in place by a conical stop 120 affixed to the tube, a spacing sleeve 122, an additional spacing sleeve or washer 124, and a threaded fastener 126 threaded into the end of the end tube 118. The fastener 126 can readily be removed to replace the cones 94.

At the upstream end of the rigid supply tube 102, the tube extends through the cones 96 and the tube has a conical stop 128 affixed to the tube and a spacing sleeve 130. The cones 96 are held in place by a coupling fitting 132 (FIG. 5) which is similar to the coupling fitting 64 of FIG. 2. The fitting 132 includes a union 134 with a nut 136 threaded on the downstream end and a nut 138 threaded on the upstream end. A split ferrule 139 is also threaded on the upstream end and clamps the coupling fitting 132 on the rigid supply tube 102 when the nut 138 is tightened. At this time, the nut 136 can be backed off somewhat to clamp the cone 96b against the spacing sleeve 130 and thereby also to hold the cone 96a in place. The coupling fitting 132 can be removed from the end of the tube 102 for replacement of the cones 96.

The overall supply tube 98 also includes a short supply tube 140 and a supply hose 142 connecting the fitting 104 with the source 100 of gas. Referring to FIG. 5, the upstream end of the tube 102 is connected to a first threaded connection 144 of the fitting 104 by a split ferrule 146 and a nut 148. The fitting 104 can thus be separated from the tube 102 to aid in cone replacement. The short supply tube 140 is connected to a second or intermediate threaded connection 150 of the fitting 104 by a ferrule 152 and nut 154.

For more critical welding, a monitoring tube 156 can extend through the tube 102, the fitting 104 and through a third threaded connection 158 thereof. A split ferrule 160 and a nut 162 seal the fitting around the monitoring tube 156 so that inert purge gas cannot escape therethrough. The fitting 104 thus can also be separated from the monitoring tube 156 for replacement of the cones 96. Just upstream of the fitting 104, the monitoring tube 156 is connected to a hose 164 which communicates with a monitoring or sensing instrument 166.

The monitoring tube 156 extends through the rigid gas supply tube 102 to the downstream end thereof where it has a flared end 168 just inside the end of the gas supply tube 102 (FIG. 4), having a press fit to form a seal therewith. The supply tube 102 has a monitoring hole 170 which communicates with the welding zone. Pressure at the downstream end of the welding zone can thus be sensed or measured through the hole 156 by the instrument 166 at the upstream end of the tube. Thus, with critical welds, in particular, the condition of the inert gas in the weld zone can always be determined to assure that sufficient inert gas is present.

Referring now to FIGS. 6 and 7, a tubular member 172 is used with a purge unit 174. The tubular member 172 is formed into a circular configuration with a longitudinally-abutting seam 176 which is then welded by welding apparatus 178. This welding apparatus 178 can be of several types, as discussed before. However, with the purge unit 174, the T.I.G. process preferably is used rather than plasma arc welding since the former requires less protection for the purge unit than the latter. Thus, the purge unit 88 of FIG. 3 is more suitable for the plasma arc process since it affords greater protection from the heat.

The purge unit 174 has first cones 180, being two in this instance, designated 180a and 180b, downstream of the weld location or zone, and second cones 182, there being two in this instance, designated 182a and 182b, upstream of the weld location or zone. Again, the cones can be the same as those of the first two embodiments, if desired. A gas supply tube 184 connects the apexes of the cones 180 and the cones 182, extending through the cones 182 and connecting with a source 186 of inert or purge gas under pressure.

The overall gas supply tube 184 includes a rigid connecting tube 188 between the cones 180 and 182, being affixed to the cones 180 in the same manner as the cones 94 are affixed to the tube 102 in FIG. 4, with a conical stop 190 affixed directly to the tube 180 and with a spacer sleeve, threaded fastener, and washer (not shown) also employed. At the upstream end, the rigid connecting tube 188 extends through the cones 182 and 182b in the same manner as in FIG. 3, with the cones held in place by a coupling fitting 192 similar to the fitting 132 of FIG. 3. Beyond the fitting 192, the rigid supply tube 188 is connected by a coupling fitting 194 employing split ferrules to an L-shaped supply tube 196 held in a fixed position by a bracket 198. The tube 196 connects with a hose 200 to the source 186. The cones 180 and 182 can thus be readily replaced in a manner similar to the cones of the embodiment of FIGS. 3–5.

In the weld zone, the supply tube 188 has upstream ports 202 and intermediate ports 204 through which gas is directed upwardly by a directional flow shield 206. This directs the purge gas more effectively toward the same weld. If desired, a monitoring tube can also be employed with the purge unit 174, using a T-shaped fitting similar to the fitting 104 in place of the coupling fitting 194.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A purge gas unit for use with tubular members, portions of which are to be joined by welding performed by welding apparatus positioned at a predetermined location relative to the length of the tubular members, said purge gas unit comprising at least one first cone to be positioned on one side of the welding apparatus location and within the tubular members, at least one second cone to be positioned on the other side of the welding apparatus location and within the tubular members, a gas supply tube connected to the apex of the first cone and extending through the apex of the second cone, said gas supply tube having an opening between said first and second cones for emitting purge gas therefrom, means for supplying the purge gas under pressure to said gas supply tube upstream of said second cone, and a monitoring tube extending inside said gas supply tube to a point between said first and second cones and communicating with the space between said first and second cones.

2. A purge gas unit according to claim 1 characterized by said gas supply tube being flexible between said first and said second cones.

3. A purge gas unit according to claim 1 characterized further by a T-shaped fitting having a first connection connected with said gas supply tube upstream of said second cone, said gas supply means communicating with said gas supply tube through a second connection of said T-shaped fitting, said monitoring tube extending beyond said gas supply tube and through a third connection of said T-shaped fitting, and a monitoring instrument communicating with said monitoring tube.

4. A purge gas unit according to claim 3 characterized by said third connection being in line with said first connection connected with said gas supply tube.

5. A purge unit according to claim 3 characterized by said second connection being intermediate said first and third connections.

6. A purge gas unit according to claim 1 characterized by said gas supply tube having an offset therein between said first and second cones at the location of the welding apparatus.

7. A purge gas unit according to claim 6 characterized by said offset portion of said gas supply tube having a shielding plate mounted thereon, said offset portion further having openings communicating with the interior of said gas supply tube.

8. A purge gas unit according to claim 1 characterized by said gas supply tube having at least one opening between said first and second cones at the location of the welding apparatus.

9. A purge gas unit according to claim 8 characterized by said gas supply tube having a directional flow shield around said one opening for directing purge gas toward the weld location.

10. In combination, a tubular member having a seam to be butt-welded at a predetermined location longitudinally of the tubular member, at least one first cone to be positioned on one side of the weld location, at least one second cone to be positioned on the other side of the weld location, means connecting said first and second cones and having openings therein through which purge gas can be supplied to space between said first cone and said second cone, means connected to said second cone for enabling relative movement between said cones and the tubular member, means upstream of said second cone for supplying purge gas to said means connecting said first and second cones, and a tubular member extending at least partially through said means connecting said first and said second cones and communicating with the space between said first and second cones for monitoring the pressure of purge gas supplied to the space.

* * * * *